United States Patent [19]

Wear

[11] 4,095,847
[45] Jun. 20, 1978

[54] PNEUMATIC CONVEYOR

[76] Inventor: Charles W. Wear, 124 Chippewa Cir., Gretna, Nebr. 68028

[21] Appl. No.: 790,308

[22] Filed: Apr. 25, 1977

[51] Int. Cl.² .............................................. B65G 53/04
[52] U.S. Cl. ......................................... 302/24; 302/25
[58] Field of Search ...................... 302/24, 25, 29, 45, 302/14, 66; 137/13; 239/430

[56] References Cited

U.S. PATENT DOCUMENTS

| 137,507 | 4/1873 | Thayer | 302/25 X |
| 140,017 | 6/1873 | Cram | 302/25 |
| 1,051,905 | 2/1913 | McCord | 302/24 |
| 1,232,393 | 7/1917 | Piper | 302/24 X |
| 1,458,523 | 6/1923 | Coutant | 302/25 X |
| 1,892,920 | 1/1933 | Weiss | 302/25 |
| 3,826,279 | 7/1974 | Verschuur | 137/13 X |

FOREIGN PATENT DOCUMENTS

| 166,013 | 11/1955 | Australia | 302/25 |

*Primary Examiner*—Evon C. Blunk
*Assistant Examiner*—James L. Rowland

*Attorney, Agent, or Firm*—Zarley, McKee, Thomte, Voorhees & Sease

[57] ABSTRACT

A first elongated hollow conveyor tube has one end in communication with the source of material to be conveyed and its other end in communication with the area to which the material is to be conveyed. A second hollow tube embraces a portion of the length of the first tube and has a larger diameter than the first tube so that an elongated annular compartment area is defined therebetween. The ends of the second tube are sealed to the exterior surface of the first tube. Air under pressure is supplied to the compartment area at approximately 15-30 PSI and 220-500 C.F.M. The first tube has a plurality of spaced-apart openings formed therein which are in communication with the compartment area. An air tube is mounted in each of the openings and has an intake end in communication with the compartment area and a discharge end in communication with the interior of the first tube. The air tubes have their discharge ends disposed relative to the interior of the first tube whereby air supplied to the compartment area will pass through the air tubes and will be discharged into the first tube towards the second end thereof to convey the material towards the second end of the tube.

2 Claims, 3 Drawing Figures

PNEUMATIC CONVEYOR

BACKGROUND OF THE INVENTION

This invention relates to a pneumatic conveyor apparatus and more particularly to an improved pneumatic conveyor apparatus.

Many types of pneumatic conveyor devices have been provided in an effort to pneumatically convey material from one area to another. For example, the following United States Patents deal with such subject: U.S. Pat. Nos. 140,017, 2,747,934, 992,114, 3,099,965, 1,232,393, 3,152,839, 1,458,523, 3,175,515, 1,819,346, 3,301,606, 3,368,849.

Although the devices of the above-identified patents may have met with some success, it is believed that the invention described herein exhibits a marked increase in efficiency over that described in the art primarily due to the configuration of the air tubes described herein and the cumulative effect thereof.

Therefore, it is a principle object of the invention to provide an improved pneumatic conveyor apparatus.

A still further object of the invention is to provide a pneumatic conveyor apparatus which includes a plurality of air tubes provided therein for improving the efficiency of air flow.

A still further object of the invention is to provide a pneumatic conveyor apparatus including air direction means to enhance the movement of material therethrough.

A still further object of the invention is to provide a pneumatic conveyor apparatus which is economical to manufacture, durable in use and refined in appearance.

These and other objects will be apparent to those skilled in the art.

SUMMARY OF THE INVENTION

Figure 1:
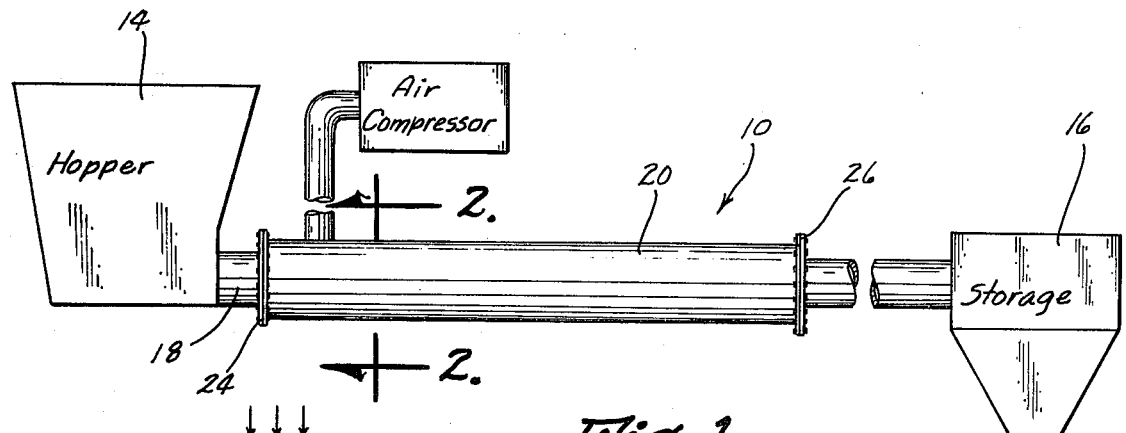
FIG. 1 is a schematic view of the conveyor apparatus of this invention.
Figure 2:
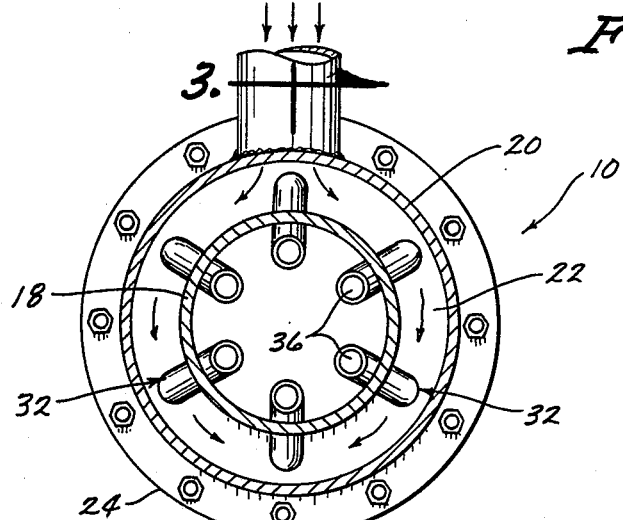
FIG. 2 is a partial sectional view seen on lines 2—2 of FIG. 1.
Figure 3:
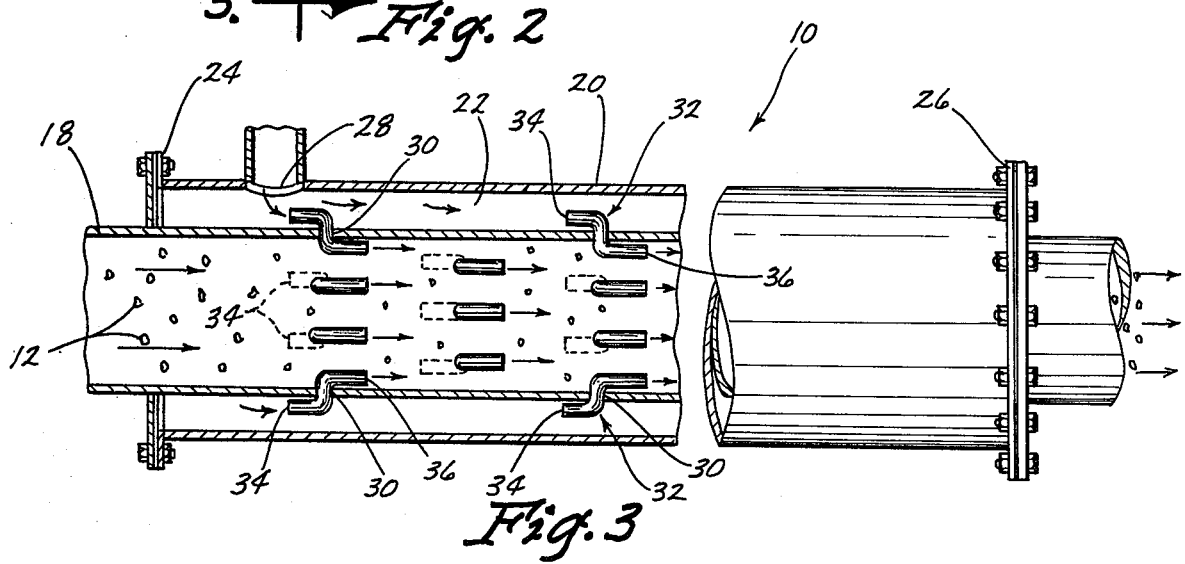
FIG. 3 is a sectional view seen on lines 3—3 of FIG. 2.

A pneumatic conveyor apparatus is disclosed for conveying materials such as grain, sand, etc. from one location to another. A first hollow conveyor tube extends from a hopper or the like to the area to which the material is to be conveyed. A second elongated hollow tube embraces a portion of the first tube so as to define an elongated annular compartment therebetween. A source of air under pressure is in communication with the compartment area. A plurality of air tubes extend from the compartment area through the first tube and have their discharge ends disposed in the interior of the first tube so that air supplied to the compartment area will pass through the air tubes and will be discharged into the first tube towards the other end thereof to convey the material towards the area to which the material is to be conveyed.

DESCRIPTION OF THE PREFERRED EMBODIMENT

The conveyor apparatus of this invention is referred to generally by the reference numeral 10 and is designed to convey material 12 from a source of material such as a hopper or the like 14 to location 16. The interior of hopper 14 is in communication with the intake end of tube 18 which extends to location 16.

The numeral 20 refers to a tube which embraces at least a portion of the length of tube 18 and which has a larger diameter than tube 18 to define an annular compartment area 22 therebetween.

As seen in the drawings, the ends 24 and 26 of the tube 20 are sealed to the exterior surface of tube 18 by any convenient means. Tube 20 is provided with an intake port 28 which is in communication with a source under pressure in the preferable range of 15–30 PSI to supply air to compartment area 22. Preferably, the air is supplied to tube 20 at the rate of 200–500 C.F.M.

Tube 18 is preferably 4 inches in diameter and provided with a plurality of spaced-apart openings 30 formed therein along that portion of the tube which is embraced by tube 20 to provide communication between compartment area 22 and the interior of tube 18. An air tube 32 is positioned in each of the openings 30 and has an intake end portion 34 in compartment area 22 and a discharge end portion 36 in tube 18. As illustrated, end portion 34 is spaced from the outer wall surface of tube 18 and extends toward end 24 of tube 18 substantially parallel to the longitudinal axis of tube 18. As also illustrated, discharge end portion 36 is spaced from the inner wall surface of tube 18 and extends toward end 26 of tube 18 substantially parallel to the longitudinal axis of tube 18.

In operation, the material 14 is placed in the hopper 12 and the end of tube 18 is placed in communication with the area which the material is to be conveyed. Air under pressure is supplied to port 28 in a preferable range of 15–30 PSI so that the air under pressure is supplied to the compartment area 22 at the rate of 200–500 C.F.M. The air in compartment area 22 is introduced into the intake end portions 34 of tubes 32 and is discharged into the interior of tube 18 substantially parallel to the longitudinal axis thereof as illustrated in the drawings.

The material in hopper 14 is then permitted to flow into tube 18 and the air being discharged from the tubes 32 engages the material and tumbles or conveys the same towards location 16. The relationship of the configuration of the air tubes 32 and the tube 18 is quite important since it has been found that the configuration illustrated in the drawings improves the conveying efficiency of the apparatus inasmuch as the air is being discharged substantially parallel to the direction of flow and slightly spaced from the interior wall surface of tube 18.

It is also important that the air tubes 32 be positioned along the length of the tube 18 since the tubes 32 cause a cumulative conveying action. In other words, the first group of air tubes 32 impart a conveying motion to the material 12 and the downstream air tubes 32 further impart a conveying action on the material. It should also be noted that a plurality of the tubes 20 and associated air tubes can be provided along the length of the tube 18 in a spaced apart relationship if great conveying distances are required. The plurality of tubes 20 and associated structure will serve as "boosters".

Thus it can be seen that a novel pneumatic conveyor apparatus has been provided which accomplishes at least all of its stated objectives.

I claim:

1. A pneumatic conveyor apparatus, comprising,
   a first elongated hollow conveyor tube means having one end in operative communication with a source of material to be conveyed and its other end in operative communication with the area to which the material is to be conveyed, at least one second elongated hollow tube means embracing at least a portion of the length of said first tube means, said second tube means having a larger diameter than said first tube means to define an elongated annular compartment area therebetween, means sealing the ends of said second tube means, a source of air under pressure in communication with said compartment area, said first tube means having a plurality of spaced-apart air directing openings formed therein which are in communication with said compartment area, each of said air directing openings having an intake end in communication with said compartment area and a discharge end portion in communication with the interior of said first tube means, said air directing openings having their discharge ends disposed relative to the interior of said first tube means whereby air supplied to said compartment area will pass through said air directing openings and will be discharged into said first tube means towards said other end to convey the material towards said other end, said air directing openings comprising an air tube having an intake end in communication with said compartment area and a discharge end portion in communication with the interior of said first tube means, said discharge end portions being disposed substantially parallel to the longitudinal axis of said first tube means.

2. The apparatus of claim 1 wherein said discharge end portions are spaced closely adjacent the inner wall surface of said first tube means.

* * * * *